Patented May 23, 1939

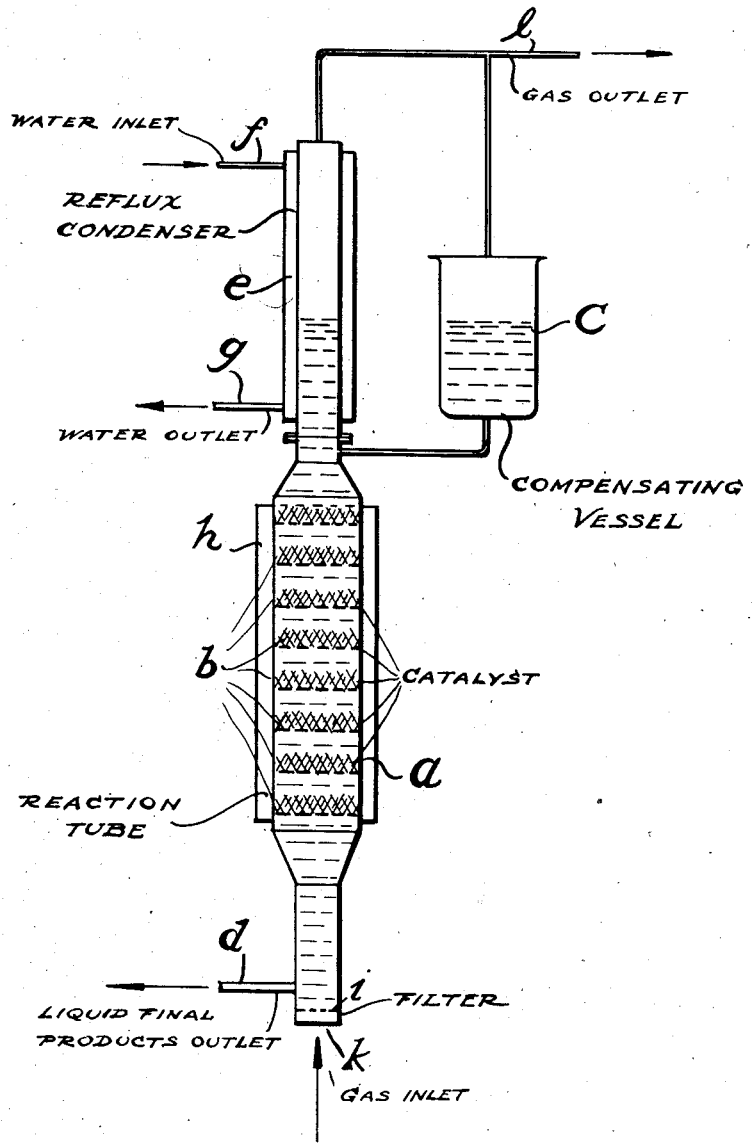

2,159,077

UNITED STATES PATENT OFFICE 2,159,077

PRODUCTION OF VALUABLE HYDROCARBONS AND THEIR DERIVATIVES CONTAINING OXYGEN

Franz Duftschmid, Heidelberg, and Eduard Linckh and Fritz Winkler, Ludwigshafen-on-the-Rhine, Germany, assignors to I. G. Farbenindustrie Aktiengesellschaft, Frankfort-on-the-Main, Germany Application November 17, 1936, Serial No. 111,306
In Germany November 18, 1935

6 Claims. (Cl. 260—449)

The present invention relates to the production of valuable hydrocarbons and their derivatives containing oxygen by the conversion of oxides of carbon, in particular carbon monoxide, with hydrogen.

It has already been proposed to convert oxides of carbon, in particular carbon monoxide, with hydrogen in the presence of catalysts at elevated temperatures and at atmospheric or increased pressure into hydrocarbons, which may be gaseous, liquid or also solid, or their derivatives containing oxygen.

For the purpose of carrying away the heat formed during the reaction it has been suggested to carry out the conversion in liquid media with finely divided catalysts suspended therein. By reason of the high temperatures necessary for the conversion and the high vapor pressures of many liquids at these temperatures the said method of working has hitherto been limited to the use of organic liquids of high boiling point which are stable under the reaction conditions.

We have now found that the said conversion of oxides of carbon with hydrogen in the presence of catalysts and at elevated temperatures into hydrocarbons or their oxygen-derivatives can be advantageously carried out by effecting the conversion in a liquid medium which consists of the oils obtained by the conversion of an amount of the same kind of initial materials previously treated under the same or similar conditions, i. e. in the proper oil, and which contains substantial amounts (of at least 1 per cent and usually between 10 and 100 per cent) of constituents which under the prevailing conditions of temperature and pressure are vaporized, i. e. gaseous or vaporous, or, in other words, of constituents the boiling point of which is below the reaction temperature under the pressure employed. Since this temperature is preferably between 200° and 420° C. the said vaporized constituents consist at least to a large extent of those boiling within the boiling range of benzines. The said constituents usually remain dissolved in the oil but they may in part also evaporate from the oil. The said liquid medium is advantageously prepared by leading the final gases and vapors formed in and leaving the reaction zone through a cooling zone which is advantageously constructed as a reflux condenser so that the vapors of the products formed which are leaving with the final gases are wholly or partly condensed and returned to the reaction zone where they form the liquid medium. The said method of working allows of a very simple and efficient leading away of the excess heat and moreover has the advantage that even very readily-boiling components of the reaction product, as for example amylene, butylene, propylene and even ethylene, or corresponding saturated hydrocarbons are returned into the reaction zone by condensation or by dissolution in the condensate flowing in the opposite direction in the cooling zone and are thus subjected to a further conversion into products of higher boiling point, whereas according to the methods hitherto used the mostly low-boiling products formed leave the reaction zone together with the final gases as the final products. Furthermore, by using suitable catalysts, it is possible according to this invention, as contrasted with the known methods, to obtain products very poor in or free from oxygen even at high pressures. The term "effecting the conversion in the proper oil" is intended to include also the manner of working in which a foreign oil is used for the commencement of the conversion but is gradually replaced by freshly formed proper oil.

According to this invention the conversion is carried out at such pressures and temperatures that the liquid phase is ensured in the reaction zone, but the working in a liquid medium according to this invention also includes that state above the critical temperature of any or all of the constituents of the "liquid medium" in which the density of the gaseous state shows no appreciable difference from that of the liquid state. The term "conversion in a liquid medium" also includes that characteristic state in the reaction zone occurring when using reflux cooling even when the critical temperature is exceeded, which state is set up in the reaction zone by reason of the constant reflux of the cooler condensed products with gaseous components dissolved therein and which probably constitutes a mixed state of the boiling liquid phase and continuous vapor formation or disengagement of dissolved vapors.

The process may also advantageously be carried out by keeping the cooling zone wholly or partly filled with the liquid so that the gases and vapors flowing through the cooler are led through the cooled condensate which is flowing downwards in a convection current and are thereby cooled and at the same time washed.

The liquid products formed are continuously or periodically withdrawn from the reaction zone or from the cooling zone while constantly maintaining a sufficient amount of liquid medium in the reaction zone. The procedure may also be that a part of the liquid medium is led in circulation through the apparatus. The introduction and withdrawal of the circulating medium may be effected into or from the reaction zone or the cooling zone. The liquid to be introduced may be preheated or cooled depending on the special operating conditions. Thus for example the commencement of the conversion may be effected by introducing hot circulating medium.

As catalysts may be mentioned finely divided solid substances suspended in the liquid medium. When using those suspended substances, a separation of the catalysts from the products formed is necessary. It has been found, however, that catalysts in the form of pieces which remain in the reaction zone during the conversion can be used with advantage according to this invention. In order that there may be a maintaining and sufficient circulation of the liquid medium and also a sufficient reflux of the condensate, and also if desired an untroubled circulation of liquid and, with these measures, a sufficiently rapid withdrawal of heat, it has been found to be preferable to distribute the single pieces of catalyst sufficiently far apart whether it be by the formation of thin layers with intermediate empty spaces or by a voluminous form of the catalyst pieces.

The process is advantageously carried out at pressures above 10 atmospheres, preferably between 50 and 250 atmospheres. Good results may, however, also be obtained at lower pressures, as for example at atmospheric pressure.

Suitable initial gas mixtures are for example those containing from 10 to 80 per cent of carbon monoxide and from 90 to 20 per cent, respectively, of hydrogen, preferably those containing from 30 to 70 per cent of carbon monoxide and from 70 to 30 per cent, respectively, of hydrogen. The initial gas mixtures may also contain inert gases, such as nitrogen or they may contain carbon dioxide.

As catalysts the substances usually employed for the conversion of carbon monoxide with hydrogen into hydrocarbons or their oxygen-containing derivatives come into consideration. When hydrocarbons are desired it is of advantage to employ iron or its compounds, in particular their oxides, preferably with activating additions, such as titanium or silicon or their compounds, in particular their oxides or heavy metals, such as uranium, manganese, tungsten, chromium or molybdenum or their compounds or compounds of alkali metals or alkaline earth metals, such as sodium, calcium, magnesium or barium. Also cobalt and nickel and their compounds or compositions containing the same may be employed.

The following example, given with reference to the accompanying drawing which shows diagrammatically a vertical section of an apparatus according to this invention, will further illustrate the nature of this invention but the invention is not restricted to this example or to the specific arrangement shown.

*Example*

A mixture of 1000 grams of iron powder (obtained by the decomposition of iron carbonyl), 25 grams of silicon powder, 25 grams of titanium dioxide, 50 grams of potassium permanganate and 50 grams of water is fused in a stream of oxygen, whereby the iron powder is oxidized to ferrosoferric oxide. The resulting melt is cooled, comminuted to a grain size of from 5 to 8 millimeters and treated with hydrogen for 48 hours at 650° C.

The catalyst thus prepared is arranged in seven layers $b$ each 7 centimeters in height over a length of 60 centimeters in a vertical high-pressure tube $a$ having an internal diameter of 4.5 centimeters. The free space between the layers $b$ of catalysts and between the single particles of catalyst and also the space up to about 30 centimeters above the uppermost layer of catalyst is filled completely with an oil boiling between 65° and 160° C. A compensating vessel $c$ is provided laterally of the high-pressure tube for the reception of excess of oil formed during the conversion. Liquid final products may be withdrawn at $d$.

At the upper end of the reaction zone, which is 90 centimeters in length, there is provided a reflux condenser $e$, water being led into its cooling jacket at $f$ and withdrawn at $g$.

A mixed gas containing 40 per cent of carbon monoxide and 60 per cent of hydrogen by volume is led in from a pipe $k$ and, after distribution through a porous filter $i$, led upwards into the reaction tube $a$ in which a pressure of 100 atmospheres prevails and which is heated to an internal temperature of from about 360° to 380° C. by an external source of heat, as for example an electrical furnace $h$ having a temperature of 480° C. The heat set free by the conversion is absorbed by the oil which is thereby partially vaporized. The vaporized portion is condensed again in the reflux condenser and flows back into the reaction zone.

The initial gas is charged through the high-pressure tube at such a rate than 75 liters of final gas per hour are obtained; this gas is withdrawn at $l$ and has the following composition:—

|  | Per cent by volume |
|---|---|
| $CO_2$ | 21 |
| $C_nH_{2n}$ | 1.4 |
| $CO$ | 15.6 |
| $H_2$ | 51.8 |
| $C_nH_{2n+2}$ | 6.8 |
| $N_2$ | 3.4 |

For each cubic meter of final gas 47 grams of oil are formed. The element analysis of this oil is as follows:—85.1 per cent of C, 14.4 per cent of H, and 0.5 per cent of O, 93 per cent of the oil boil between 40° and 300° C.

Contrary to expectation, only a slight amount of water is formed during the conversion. The oxygen of the portion of the carbon monoxide which has reacted to form hydrocarbons is practically completely present in the form of carbon dioxide at the end of the conversion. The oil formed, in spite of the high pressure used is, contrary to expectation, practically free from oxygen. Furthermore there is no deposition of carbon.

What we claim is:

1. A process for the catalytic conversion of mixtures comprising from 1 to 8 parts of carbon monoxide and from 9 to 2 parts of hydrogen in each 10 parts of the sum of these gases at an elevated temperature between 200 and 420° C. into substances selected from the group consisting of hydrocarbons and their oxygen derivatives in the presence of a catalyst promoting this conversion which comprises carrying out this conversion in a liquid medium consisting of the oils obtained by a previous conversion of an amount of the same kind of initial materials under the same or similar conditions and which contains substantial amounts of constituents the boiling point of which, is within the boiling range of benzines, and applying a pressure under which the said liquid medium is established.

2. In the process as claimed in claim 1 passing the gases and vapors issuing from the conversion space through a cooling space condensing in this space part of the said gases and vapors and returning the said condensed part to the conversion space.

3. In the process as claimed in claim 1, passing the gases and vapors issuing from the conversion space through a cooling space filled at least partly with liquid, condensing in this space part of the said gases and vapors and returning the said condensed part to the conversion space.

4. In the process as claimed in claim 1, carrying out the conversion in the presence of a catalyst having the form of pieces.

5. In the process as claimed in claim 1 passing part of the liquid medium in a cycle through the conversion space.

6. In the process as claimed in claim 1, passing the gases and vapors issuing from the conversion space through a cooling space and passing also part of the liquid medium in a cycle through the cooling space.

FRANZ DUFTSCHMID.
EDUARD LINCKH.
FRITZ WINKLER.